(12) United States Patent
Touronen et al.

(10) Patent No.: US 11,624,030 B2
(45) Date of Patent: Apr. 11, 2023

(54) PRODUCTION OF HYDROCARBONS FROM RECYCLED OR RENEWABLE ORGANIC MATERIAL

(71) Applicant: Neste Oyj, Espoo (FI)

(72) Inventors: Jouni Touronen, Porvoo (FI); Marina Lindblad, Porvoo (FI); Mats Käldström, Porvoo (FI); Kaisa Lamminpää, Porvoo (FI)

(73) Assignee: NESTE OYJ, Espoo (FI)

( * ) Notice: Subject to any disclaimer, the term of this patent is extended or adjusted under 35 U.S.C. 154(b) by 276 days.

(21) Appl. No.: 17/261,765

(22) PCT Filed: Jul. 19, 2019

(86) PCT No.: PCT/EP2019/069512
§ 371 (c)(1),
(2) Date: Jan. 20, 2021

(87) PCT Pub. No.: WO2020/016415
PCT Pub. Date: Jan. 23, 2020

(65) Prior Publication Data
US 2021/0292653 A1    Sep. 23, 2021

(30) Foreign Application Priority Data
Jul. 20, 2018    (FI) .................................. 20185655

(51) Int. Cl.
*C10G 1/00* (2006.01)
*C10G 1/02* (2006.01)
(Continued)

(52) U.S. Cl.
CPC .............. *C10G 1/002* (2013.01); *C10G 1/02* (2013.01); *C10G 3/40* (2013.01); *C10G 3/50* (2013.01);
(Continued)

(58) Field of Classification Search
CPC . C10G 1/002; C10G 1/02; C10G 3/40; C10G 3/50; C10G 9/00; C10G 11/00;
(Continued)

(56) References Cited

U.S. PATENT DOCUMENTS 2,524,088 A    10/1950 Shaw
3,503,866 A    3/1970 Skripek et al.
(Continued)

FOREIGN PATENT DOCUMENTS

CA    894222 A    2/1972
CN    102786986 A    11/2012
(Continued)

OTHER PUBLICATIONS

Office Action (Communication) dated Mar. 30, 2022, by the European Patent Office in corresponding European Patent Application No. 19742575.4. (8 pages).
(Continued)

*Primary Examiner* — Ali Z Fadhel
(74) *Attorney, Agent, or Firm* — Buchanan Ingersoll & Rooney PC (57) ABSTRACT

A method is disclosed of producing hydrocarbons from a recycled or renewable organic material, wherein the recycled or renewable organic material contains from 5 to 30 wt-% oxygen as organic oxy-gen compounds and from 1 to 1000 ppm phosphorous as phosphorous compounds. Exemplary methods include (a) providing the recycled or renewable organic material (c) thermally cracking the recycled or renewable organic material thereby reducing the oxygen and phosphorous content of the recycled or renewable organic material to obtain (i) a vapor fraction containing a major part of volatiles, and (ii) a thermally cracked recycled or renewable organic material fraction containing less oxygen and less phosphorous than the recycled or renewable organic
(Continued)

material provided in step (a); and (f) hydrotreating the thermally cracked recycled or renewable organic material fraction in a presence of a hydrotreating catalyst; to obtain hydrocarbons containing less than 1 wt % oxygen and less phosphorous than the recycled or re-newable organic material provided in step (a).

29 Claims, 3 Drawing Sheets

(51) Int. Cl.
  C10G 3/00  (2006.01)
  C10G 9/00  (2006.01)
  C10G 11/00  (2006.01)
  C10G 45/02  (2006.01)
(52) U.S. Cl.
  CPC .............. C10G 9/00 (2013.01); C10G 11/00 (2013.01); C10G 45/02 (2013.01); C10G 2300/1003 (2013.01); C10G 2300/1011 (2013.01); C10G 2300/202 (2013.01); C10G 2300/4006 (2013.01); C10G 2300/4012 (2013.01)
(58) Field of Classification Search
  CPC ............ C10G 45/02; C10G 2300/1003; C10G 2300/1011; C10G 2300/202; C10G 2300/4006; C10G 2300/4012; C10G 3/42; C10G 45/04; Y02P 30/20; B01D 15/12
  See application file for complete search history.

(56) References Cited

U.S. PATENT DOCUMENTS

| | | | |
|---|---|---|---|
| 4,097,369 A | 6/1978 | Ebel et al. | |
| 4,151,072 A | 4/1979 | Johnson et al. | |
| 4,160,725 A | 7/1979 | Josis et al. | |
| 4,241,227 A | 12/1980 | Stonner et al. | |
| 4,252,637 A | 2/1981 | Knorre et al. | |
| 4,328,128 A | 5/1982 | Stanulonis et al. | |
| 5,049,258 A | 9/1991 | Keim et al. | |
| 5,449,797 A | 9/1995 | Estes et al. | |
| 5,514,632 A | 5/1996 | Chester et al. | |
| 6,072,065 A | 6/2000 | Chavet | |
| 6,586,638 B1 | 7/2003 | Zhang et al. | |
| 9,347,178 B2 | 5/2016 | Powell et al. | |
| 9,353,478 B2 * | 5/2016 | Powell | C10G 1/065 |
| 9,382,483 B2 | 7/2016 | Knuuttila et al. | |
| 9,399,836 B2 * | 7/2016 | Powell | C07C 1/24 |
| 9,593,448 B2 * | 3/2017 | Powell | C13K 1/02 |
| 9,663,720 B2 | 5/2017 | Nousiainen et al. | |
| 9,688,919 B2 | 6/2017 | Vilonen et al. | |
| 9,932,530 B2 | 4/2018 | Garg et al. | |
| 10,023,810 B2 | 7/2018 | Nousiainen et al. | |
| 10,815,428 B2 * | 10/2020 | Nousiainen | C10G 21/20 |
| 2005/0101761 A1 | 5/2005 | Lambert et al. | |
| 2005/0240065 A1 | 10/2005 | Blaschke et al. | |
| 2006/0167291 A1 | 7/2006 | Te et al. | |
| 2007/0170091 A1 | 7/2007 | Monnier et al. | |
| 2008/0314799 A1 | 12/2008 | Li et al. | |
| 2009/0229172 A1 | 9/2009 | Brady et al. | |
| 2009/0250376 A1 | 10/2009 | Brandvoid et al. | |
| 2011/0138680 A1 | 6/2011 | Dandeu et al. | |
| 2012/0088943 A1 | 4/2012 | Knuuttila et al. | |
| 2012/0116134 A1 | 5/2012 | Bozzano et al. | |
| 2013/0072730 A1 | 3/2013 | Knuuttila et al. | |
| 2013/0090502 A1 | 4/2013 | Laakkonen et al. | |
| 2013/0158329 A1 | 6/2013 | Brandvoid | |
| 2013/0305598 A1 | 11/2013 | Hamilton et al. | |
| 2013/0345487 A1 | 12/2013 | Baird et al. | |
| 2014/0005451 A1 | 1/2014 | Mezza et al. | |
| 2014/0275666 A1 | 9/2014 | Bauer et al. | |
| 2015/0052807 A1 | 2/2015 | Nousiainen et al. | |
| 2015/0059354 A1 | 3/2015 | Gutierrez et al. | |
| 2015/0251168 A1 | 9/2015 | Kettunen et al. | |
| 2015/0361356 A1 | 12/2015 | Garg et al. | |
| 2016/0060540 A1 | 3/2016 | Ouni et al. | |
| 2016/0130509 A1 | 5/2016 | Nousiainen et al. | |
| 2016/0177188 A1 | 6/2016 | Vilonen et al. | |
| 2016/0177201 A1 | 6/2016 | Pandranki et al. | |
| 2016/0186067 A1 | 6/2016 | Powell et al. | |
| 2016/0257888 A1 | 9/2016 | Nousiainen et al. | |
| 2016/0289576 A1 | 10/2016 | Eilos | |
| 2017/0145318 A1 | 5/2017 | Myllyoja et al. | |
| 2017/0158967 A1 | 6/2017 | Reiner et al. | |
| 2019/0203154 A1 | 7/2019 | Malm | |
| 2020/0308505 A1 | 10/2020 | Dayton et al. | |
| 2021/0269722 A1 | 9/2021 | Touronen et al. | |
| 2021/0277324 A1 | 9/2021 | Toukoniitty et al. | |
| 2021/0284925 A1 | 9/2021 | Gao et al. | |
| 2021/0292653 A1 | 9/2021 | Touronen et al. | |
| 2021/0292656 A1 | 9/2021 | Touronen et al. | |
| 2021/0292657 A1 | 9/2021 | Toukoniitty et al. | |
| 2021/0301210 A1 | 9/2021 | Timken et al. | |
| 2021/0332300 A1 | 10/2021 | Timken | |
| 2022/0135891 A1 | 5/2022 | Toukoniitty et al. | |

FOREIGN PATENT DOCUMENTS

| | | |
|---|---|---|
| CN | 106552611 A | 4/2017 |
| CN | 107636124 A | 1/2018 |
| CN | 107892990 A | 4/2018 |
| CN | 107974265 A | 5/2018 |
| CN | 107974266 A | 5/2018 |
| CN | 108251156 A | 7/2018 |
| EP | 0072873 A1 | 3/1983 |
| EP | 0420651 A1 | 4/1991 |
| EP | 0420652 A1 | 4/1991 |
| EP | 0574272 A2 | 12/1993 |
| EP | 1396531 A2 | 3/2004 |
| EP | 2149593 A1 | 2/2010 |
| EP | 2930231 A1 | 10/2015 |
| FI | 20135638 A | 12/2014 |
| JP | S5431484 B2 | 10/1979 |
| JP | H0940970 A | 2/1997 |
| JP | H1161148 A | 3/1999 |
| JP | 2000169862 A | 6/2000 |
| JP | 2003034794 A | 2/2003 |
| JP | 2003253038 A | 9/2003 |
| JP | 2007224196 A | 9/2007 |
| JP | 2009155475 A | 7/2009 |
| JP | 2010509472 A | 3/2010 |
| JP | 2011515539 A | 5/2011 |
| JP | 2013544304 A | 12/2013 |
| SE | 352373 B | 12/1972 |
| WO | 2008058664 A1 | 5/2008 |
| WO | 2012069467 A1 | 5/2012 |
| WO | 2013089838 A1 | 6/2013 |
| WO | 2013156683 A1 | 10/2013 |
| WO | 2014001632 A1 | 1/2014 |
| WO | 2015087938 A1 | 6/2015 |
| WO | 2015101713 A1 | 7/2015 |
| WO | 2016053948 A1 | 4/2016 |
| WO | 2018024728 A1 | 2/2018 |
| WO | 2018025103 A1 | 2/2018 |
| WO | 2018025104 A1 | 2/2018 |
| WO | 2018058172 A1 | 4/2018 |
| WO | 2018127812 A1 | 7/2018 |

OTHER PUBLICATIONS

Office Action (Opposition) dated Dec. 15, 2021, by the Finnish Patent Office in corresponding Finnish Patent Application No. FI 128911. (34pages).
Office Action dated Mar. 17, 2022, by the U.S. Patent Office in corresponding U.S. Appl. No. 17/261,679.
First Office Action dated Feb. 15, 2022, by the Chinese Patent Office in corresponding Chinese Patent Application No. 2019800484072, and an English Translation of the Office Action. (18 pages).

(56) References Cited

OTHER PUBLICATIONS

First Office Action dated Feb. 15, 2022, issued in the corresponding Chinese Patent Application No. 2019800477596, 15 pages including 6 pages of English Translation.
Search Report dated Mar. 24, 2022, issued in the corresponding Chinese Patent Application No. 2019800538354, 3 pages of official copy without English Translation.
Office Action dated Mar. 1, 2022, issued in the corresponding Japanese Patent Application No. 2021-502416, 4 pages including 2 pages of English Translation.
Office Action dated Mar. 1, 2022, issued in the corresponding Japanese Patent Application No. 2021-502417, 10 pages including 6 pages of English Translation.
Office Action dated Mar. 1, 2022, issued in the corresponding Japanese Patent Application No. 2021-502426, 5 pages including 3 pages of English Translation.
Office Action dated Mar. 8, 2022, issued in the corresponding Japanese Patent Application No. 2021-502928, 8 pages including 5 pages of English Translation.
Energy Fossil, Recovery of Navy Distillate Fuel from Reclaimed Product, Dennis W. Brinkman & Marwin L. Whisman (Published Nov. 1984).
Fats and Oils: Formulating and Processing for Applications, Third Edition By Richard D. O'Brien (2009).
Finnish Office Action dated Apr. 23, 2019 for Application No. 2185650.
International Preliminary Report on Patentability issued in corresponding International Patent Application No. PCT/EP2019/069474 dated Dec. 15, 2020.
International Preliminary Report on Patentability issued in corresponding International Patent Application No. PCT/EP2019/069482 dated Jan. 21, 2021.
International Preliminary Report on Patentability issued in corresponding International Patent Application No. PCT/EP2019/069490 dated Jul. 15, 2020.
International Preliminary Report on Patentability issued in corresponding International Patent Application No. PCT/EP2019/069497 dated Oct. 9, 2020.
International Preliminary Report on Patentability issued in corresponding International Patent Application No. PCT/EP2019/069503 dated Sep. 20, 2020.
International Preliminary Report on Patentability issued in corresponding International Patent Application No. PCT/EP2019/069512 dated Sep. 20, 2020.
International Search Report (PCT/ISA/210) and Written Opinion (PCT/ISA/237) dated Dec. 19, 2019, by the European Patent Office as the International Searching Authority for International Application No. PCT/EP2019/069503.
International Search Report (PCT/ISA/210) and Written Opinion (PCT/ISA/237) dated Dec. 5, 2019, by the European Patent Office as the International Searching Authority for International Application No. PCT/EP2019/069474.
International Search Report (PCT/ISA/210) and Written Opinion (PCT/ISA/237) dated Nov. 12, 2019, by the European Patent Office as the International Search Authority for International Patent Application No. PCT/EP2019/069482.
International Search Report (PCT/ISA/210) and Written Opinion (PCT/ISA/237) dated Sep. 10, 2019, by the European Patent Office as the International Searching Authority for International Application No. PCT/EP2019/069497.
International Search Report (PCT/ISA/210) and Written Opinion (PCT/ISA/237) dated Sep. 10, 2019, by the European Patent Office as the International Searching Authority for International Application No. PCT/EP2019/069512.
International Search Report (PCT/ISA/210) with translation and Written Opinion (PCT/ISA/237) dated Nov. 12, 2019, by the European Patent Office as the International Searching Authority for International Application No. PCT/EP2019/069490.
Punkkinen Henna et al., Research Report: "Thermal conversion of plastic-containing waste: A Review" (2017).
Search Report dated Apr. 9, 2019 by the Finnish Patent and Registration Office for Application No. 20185651.
Search Report dated Nov. 12, 2018 by the Finnish Patent and Registration Office for Application No. 20185651.
Search Report dated Nov. 19, 2018 by the Finnish Patent and Registration Office for Application No. 20185653.
Search Report dated Nov. 20, 2018 by the Finnish Patent and Registration Office for Application No. 20185654.
Search Report dated Nov. 21, 2018 by the Finnish Patent and Registration Office for Application No. 20185655.
Search Report dated Nov. 21, 2018 by the Finnish Patent and Registration Office for Application No. 2185650.
Search Report dated Nov. 6, 2018 by the Finnish Patent and Registration Office for Application No. 20185652.
Mohd Zin, Rohani Binti, et al., "Process Design in Degumming and Bleaching of Palm Oil", Centre of Lipids Engineering and Applied Research (CLEAR), Universiti Teknologi Malaysia, Nov. 2006, 239 pages.
Pyl, Steven P., et al., "Wood-derived olefins by steam cracking of hydrodeoxygenated tall oils", Bioresource Technology 126, 2012, pp. 48-55, Elsevier Ltd.
Sigot, L., et al., "Adsorption of octamethylcyclotetrasiloxane on silica gel for biogas purification", Fuel, Jul. 8, 2014, vol. 135, pp. 205-209.
Vogt, E.T.C., et al., "Fluid catalytic cracking: recent developments on the grand old lady of zeolite catalysis", Chem. Soc. Rev., Sep. 18, 2015, pp. 7342-7370, The Royal Society of Chemistry.
Office Action dated Nov. 10, 2022, by the U.S. Patent and Trademark Office in U.S. Appl. No. 17/261,754.
Office Action dated Sep. 15, 2022, by the U.S. Patent and Trademark Office in U.S. Appl. No. 17/261,736.

* cited by examiner

PRODUCTION OF HYDROCARBONS FROM RECYCLED OR RENEWABLE ORGANIC MATERIAL

FIELD OF THE INVENTION

The present invention relates to a method of producing hydrocarbons from a recycled or renewable organic material, in particular from a recycled or renewable organic material comprising organic oxygen compounds and phosphorous compounds.

BACKGROUND OF THE INVENTION

Recycled or renewable organic material typically contains organic oxygen compounds and phosphorous compounds. Before hydrotreating the recycled or renewable organic material by catalytic processing the phosphorous compounds need to be removed from the material as phosphorous and excess oxygen is thought to cause pore blocking of catalysts during upgrading.

BRIEF DESCRIPTION OF THE INVENTION

An object of the present invention is thus to provide a method so as to overcome the above problems. The objects of the invention are achieved by a method which is characterized by what is stated in the independent claims. The preferred embodiments of the invention are disclosed in the dependent claims.

The invention is based on the surprising realization that hydrocarbons may be produced from recycled or renewable organic material containing organic oxygen compounds and phosphorous compounds by a method that leads to removal of oxygen and phosphorous from recycled or renewable organic material as the recycled or renewable organic material is thermally cracked at a temperature between 350 to 450° C., and then hydrotreated in a presence of a hydrotreating catalyst to obtain hydrocarbons comprising less than 1 wt % oxygen and less than 10% of the original phosphorous content of the recycled or renewable organic material provided in step (a).

The method allows use of low quality recycled or renewable organic material feeds as a feedstock in producing hydrocarbons, e.g. in processes producing high quality renewable fuels and/or chemicals.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The present invention provides a method of producing hydrocarbons from a recycled or renewable organic material.

The term "recycled or renewable organic material" refers to organic material, i.e. material containing carbon, obtained 1) from a natural resource which replenishes to overcome recourse depletion caused by its usage and consumption or 2) from a raw or processed material that is recovered from a waste for reuse. The recycled or renewable organic material characteristically comprises aliphatic compounds having a carbon chain of from 4 to 30 carbon atoms, particularly from 12 to 22 carbon atoms. Typical examples of such aliphatic compounds are fatty acids or esters thereof, in particular wherein the fatty acids have an aliphatic chain of from 4 to 30 carbon atoms, more particularly from 12 to 22 carbon atoms. The recycled or renewable organic material typically comprises at least 50 wt % aliphatic compound of the total weight of the recycled or renewable organic material.

Typically the recycled or renewable organic material refers to fats and/or oils of plant, microbial, algal, and/or animal origin. It also refers to any waste stream received from processing of such oils and/or fats. The recycled or renewable organic material may be in an unprocessed form (e.g. animal fat), or a processed form (used cooking oil). The recycled or renewable organic material also refers to fossil waste-based oils and waste oils.

The term "plant based fats and oils" refers to fat and/or oils of plant origin i.e. oils that can originate directly from plants or can be byproducts from various industrial sectors, such as agriculture or forest industry.

Examples of plant based fats and oils of the present invention include, but are not limited to, sludge palm oil, rapeseed oil, canola oil, colza oil, sunflower oil, soybean oil, hemp oil, olive oil, linseed oil, cottonseed oil, mustard oil, palm oil, arachis oil, castor oil and coconut oil.

Other examples of plant based fats and oils include biocrudes and bio oils. Biocrudes and bio oils are produced from biomass, in particular from lignocellulosic biomass, with various liquefying methods, such as hydrothermal liquefaction, or pyrolysis, in particular fast pyrolysis.

The term "biocrude" refers to oils produced from biomass by employing hydrothermal liquefaction. The term "bio oil" refers to pyrolysis oils produced from biomass by employing pyrolysis. The term "biomass" refers to material derived from recently living organisms, which includes plants, animals and their byproducts. The term "lignocellulosic biomass" refers to biomass derived from plants or their byproducts. Lignocellulosic biomass is composed of carbohydrate polymers (cellulose, hemicellulose) and an aromatic polymer (lignin).

The term "pyrolysis" refers to thermal decomposition of materials at elevated temperatures in a non-oxidative atmosphere. The term "fast pyrolysis" refers to thermochemical decomposition of biomass through rapid heating in absence of oxygen. The term "hydrothermal liquefaction" (HTL) refers to a thermal depolymerization process used to convert wet biomass into crude-like oil under moderate temperature and high pressure.

Examples of bio oil and biocrude produced from lignocellulosic biomass, e.g. materials like forest harvesting residues or byproducts of a saw mill, are lignocellulosic pyrolysis liquid (LPL), produced by employing fast pyrolysis, and HTL-biocrude, produced by employing hydrothermal liquefaction.

Further examples of plant based fats and oils include crude tall oil (CTO), obtained as a by-product of the Kraft process (wood pulping), and its derivatives, such as tall oil pitch (TOP), crude fatty acid (CFA), tall oil fatty acid (TOFA) and distilled tall oil (DTO).

Crude tall oil comprises resin acids, fatty acids, and unsaponifiables. Resin acids are a mixture of organic acids derived from oxidation and polymerization reactions of terpenes. The main resin acid in crude tall oil is abietic acid but abietic derivatives and other acids, such as primaric acid are also found. Fatty acids are long chain monocarboxylic acids and are found in hardwoods and softwoods. The main fatty acids in crude tall oil are oleic, linoleic and palmitic acids. Unsaponifiables cannot be turned into soaps as they are neutral compounds which do not react with sodium hydroxide to form salts. They include sterols, higher alcohols and hydrocarbons. Sterols are steroids derivatives which also include a hydroxyl group.

The term "tall oil pitch (TOP)" refers to residual bottom fraction from crude tall oil (CTO) distillation processes. Tall oil pitch typically comprises from 34 to 51 wt % free acids, from 23 to 37 wt % esterified acids, and from 25 to 34 wt % unsaponifiable neutral compounds of the total weight of the tall oil pitch. The free acids are typically selected from a group consisting of dehydroabietic acid, abietic and other resin acids. The esterified acids are typically selected from a group consisting of oleic and linoleic acids. The unsaponifiables neutral compounds are typically selected from a group consisting of diterpene sterols, fatty alcohols, sterols, and dehydrated sterols.

The term "crude fatty acid (CFA)" refers to fatty acid-containing materials obtainable by purification (e.g., distillation under reduced pressure, extraction, and/or crystallization) of CTO.

The term "tall oil fatty acid (TOFA)" refers to fatty acid rich fraction of crude tall oil (CTO) distillation processes. TOFA typically comprises mainly fatty acids, typically at least 80 wt % of the total weight of the TOFA. Typically TOFA comprises less than 10 wt % rosin acids.

The term "distilled tall oil (DTO)" refers to resin acid rich fraction of crude tall oil (CTO) distillation processes. DTO typically comprises mainly fatty acids, typically from 55 to 90 wt %, and rosin acids, typically from 10 to 40 wt % rosin acids, of the total weight of the DTO. Typically DTO comprises less than 10 wt % unsaponifiable neutral compounds of the total weight of the distilled tall oil.

The term "animal based fats and oils" refers to fats and/or oils of animal origin i.e. lipid materials derived from animals. Examples of animal based fats and oils include, but are not limited to, such as suet, tallow, blubber, lard, train oil, milk fat, fish oil, poultry oil and poultry fat.

The term "microbial oils" refers to triglycerides (lipids) produced by microbes.

The term "algal oils" refers to oils derived directly from algae.

The term "fossil waste-based oils" refers to oils produced from waste streams like waste plastics or end-life-tires. Examples of fossil waste-based oils include waste plastic pyrolysis oil (WPPO) and end-life-tire pyrolysis oil (ELTPO).

The term "waste oils" refers to any oils that, through contamination, have become unsuitable for their original purpose due to the presence of impurities or loss of original properties. Examples of waste oils are used lubricant oils (ULO), hydraulic oils, transformer oils or oils used in metal working.

In the present invention the recycled or renewable organic material is typically selected from a group consisting of plant based fats and oils, animal based fats and oils, fossil waste-based oils, waste oils, algal oils and microbial oils.

Particular examples of the recycled or renewable organic material of the present invention include, but are not limited to, animal based fats and oils, such as suet, tallow, blubber, lard, train oil, milk fat, fish oil, poultry oil, and poultry fat; plant based fats and oils, such as sludge palm oil, rapeseed oil, canola oil, colza oil, sunflower oil, soybean oil, hemp oil, olive oil, linseed oil, cottonseed oil, mustard oil, palm oil, arachis oil, castor oil, coconut oil, lignocellulosic pyrolysis liquid (LPL), HTL biocrude, crude tall oil (CTO), tall oil pitch (TOP), crude fatty acid (CFA), tall oil fatty acid (TOFA) and distilled tall oil (DTO); microbial oils; algal oils; recycled fats or various waste streams of the food industry, such as used cooking oil, yellow and brown greases; free fatty acids, any lipids containing phosphorous and/or metals, oils originating from yeast or mold products, recycled alimentary fats; starting materials produced by genetic engineering, and any mixtures of said feedstocks. In an example of the present invention the recycled or renewable organic material is selected from a group consisting of tall oil, its derivates and pyrolysis oils; in particular from a group consisting of tall oil, tall oil pitch (TOP), crude fatty acids (CFA), tall oil fatty acids (TOFA), distilled tall oil (DTO), lignocellulose pyrolysis liquid (LPL) and HTL-biocrude. In particular, the recycled or renewable organic material is tall oil pitch (TOP).

The recycled or renewable organic material to be treated by the present method contains impurities comprising phosphorus and may also comprise other impurities such as metals. These impurities are typically present in the form of phospholipids, soaps and/or salts. Further impurities may for example be in the form of phosphates or sulfates, iron salts, organic salts, or soaps. The metal impurities that may be present in the biomass-based lipid material are for example alkali metals or alkali earth metals, such as sodium or potassium salts, or magnesium or calcium salts, or any compounds of said metals.

The recycled or renewable organic material of the present invention comprises from 1 to 1000 ppm phosphorous as phosphorous compounds. The phosphorous compounds present in the recycled or renewable organic material are typically phospholipids. The phospholipids present in the recycled or renewable organic material are in particular one or more of phosphatidyl ethanolamines, phosphadityl cholines, phosphatidyl inositols, phosphatidic acids, and phosphatidyl ethanolamines.

The recycled or renewable organic material of the present invention further comprises from 5 to 30 wt-% oxygen as organic oxygen compounds of the total weight of the recycled or renewable organic material.

In a particular example the recycled or renewable organic material comprises i) more than 20 ppm, especially more than 50 ppm, particularly more than 70 ppm, phosphorous compounds; and ii) more than 5 wt % of the total weight of the biomass-based lipid material, especially from 8 to 15 wt % organic oxygen compounds of the total weight of the recycled or renewable organic material.

Accordingly provided herein is method of producing hydrocarbons from a recycled or renewable organic material, wherein the recycled or renewable organic material comprises from 5 to 30 wt-% oxygen as organic oxygen compounds and from 1 to 1000 ppm phosphorous as phosphorous compounds, comprising the steps of (a) providing the recycled or renewable organic material;

(b) optionally heat treating the recycled or renewable organic material to form a heat treated recycled or renewable organic material, wherein the at least part of silicon compounds present in the recycled or renewable organic material are converted to volatile silicon compounds; and (c) thermally cracking the recycled or renewable organic material thereby reducing the oxygen and phosphorous content of the recycled or renewable organic material to obtain (i) a vapor fraction comprising the major part of volatiles, and (ii) a thermally cracked recycled or renewable organic material fraction comprising less oxygen and less phosphorous than the recycled or renewable organic material provided in step (a);

(d) optionally removing volatiles from the vapor fraction;

(e) optionally removing solids/precipitates from the thermally cracked recycled or renewable organic material fraction; and (f) hydrotreating the thermally cracked recycled or renewable organic material fraction in a presence of a hydrotreating catalyst;

to obtain hydrocarbons comprising less than 1 wt % oxygen and less phosphorous than the recycled or renewable organic material provided in step (a).

In step (c) the recycled or renewable organic material is heated to cause thermal cracking of the recycled or renewable organic material disrupting phosphorus compounds comprised in the recycled or renewable organic material creating a solid material that can be subsequently removed from the heat treated recycled or renewable organic material e.g. by filtration.

The thermal cracking of step (c) may be performed in a separate reactor unit or in hydrotreating reactor before catalyst bed at a guard bed.

Accordingly in step (c) the recycled or renewable organic material is thermally cracked thereby reducing the oxygen content of the recycled or renewable organic material and phosphorous content of the recycled or renewable organic material.

The thermal cracking of step (c) typically takes place at any temperature from 350 to 450° C.

The thermal cracking of step (c) takes place in an apparatus enabling sufficient residence time. The time during which the recycled or renewable organic material is heated and held at the desired temperature, i.e. residence time, is typically from 1 to 300 min, preferably from 5 to 240 min, more preferably from 30 to 90 min in step (c).

The pressure in step (c) is such that sufficient oxygen removal is achieved. Typically the pressure in step (c) is from 4 to 20 MPa, preferably from 8 to 16 MPa.

After the thermal cracking of step (c) the volatiles created due to the thermal cracking and/or otherwise present in the recycled or renewable organic material may be removed. Accordingly (d) the recycled or renewable organic material is optionally subjected to removing volatiles from the vapor fraction obtained in step (c) from the recycled or renewable organic material. This can be achieved in one or more stages. Typical examples of the volatiles include CO and $CO_2$.

Removal of the volatiles may be achieved for example by any separation method found suitable by a skilled person for separation of the volatiles from the thermally cracked renewable or recycled material. Suitable examples include, but are not limited to, evaporation, in particular flash evaporation and thin film evaporation.

The optimum temperature, pressure, evaporated mass and how many flash stages to use depends on composition and quality of the recycled or renewable organic material and also on the thermal cracking parameters (temperature, pressure and residence time) of step (c).

The temperature and pressure in step (d) is such that evaporation of volatile oxygen compounds is achieved. In step (d) the removal of volatiles is typically achieved at any temperature from 300 to 450° C. For achieving optimal results, step (d) is performed at from 350° C. to 450° C. Typically the pressure in step (d) is from 0.1 to 5 kPa, preferably from 0.1 to 3 kPa.

Removal of volatiles reduces the amount of oxygen in the recycled or renewable organic material.

Prior to thermal cracking of step (c) the recycled or renewable organic material may be subjected to heat treatment to convert at least part of silicon compounds present in the recycled or renewable organic material to volatile silicon compounds.

In step (b) the recycled or renewable organic material is heated to cause thermal reactions that disrupt silicon containing impurities comprised in the recycled or renewable organic material creating volatile silicon compounds material that can be subsequently removed from the heat treated recycled or renewable organic material. In particular polydimethylsiloxanes (PDMS) resulting from anti-fouling agents degrade to volatile polydimethylcyclosiloxanes (PDMCS) under the process conditions.

In step (b) the water content in the feed, i.e. the recycled or renewable organic material may advantageously vary in from 200 to 5000 ppm. If the recycled or renewable organic material comprises more than 5000 ppm water, it may be removed from the feed before step (b) by any suitable means known to a skilled person for lowering the water content in the recycled or renewable organic material below 5000 ppm.

The heat treatment of step (b) typically takes place at any temperature from 180 to 325° C. For achieving optimal results, step (b) is performed at 200 to 300° C., preferably at 240 to 280° C.

The time during which the recycled or renewable organic material is heated and held at the desired temperature, i.e. residence time, is typically from 1 to 300 min, preferably from 5 to 90 min, more preferably from 20 to 40 min in step (b).

The pressure in the heat treatment in step (b) is typically from 500 to 5000 kPa, preferably from 800 to 2000 kPa.

The pressure range in step (b) is dictated by volatility of water and it is advantageous to keep the heat treatment pressure slightly higher than the balance pressure of water boiling in particular heat treatment temperature. Too low pressure may drive volatile components like water and fractions of fatty acids into gas phase. Carry over of organic volatiles is enhanced by presence of water or stripping.

Optionally, the process can be further enhanced by acid addition before or after heat treatment in step (b). This removes any remaining sodium impurities. The acid is preferably selected from citric acid and phosphoric acid.

In step (b) the solid material created due to the heat treatment may be removed. Removal of the solid material may be achieved for example by any separation method found suitable by a skilled person for separation of the solid material from the heat treated renewable or recycled material. Suitable examples include, but are not limited to, filtration, centrifugation, bleaching, degumming and phase separation. It is also to be understood that several separation methods, e.g. filtration and centrifugation, may be combined. Preferably the removal is accomplished by filtration. The removal is preferably performed at any temperature from 100 to 180° C.

Removal or solids/precipitates avoids deactivation of the hydrotreating catalyst in hydrotreatment of the renewable or recycled material.

After the thermal cracking of step (c) the solid material created due to the thermal cracking may be removed. Accordingly in step (f) the recycled or renewable organic material is optionally subjected to removing solids/precipitates from the recycled or renewable organic material.

Removal of the solid material may be achieved for example by any separation method found suitable by a skilled person for separation of the solid material from the thermally cracked renewable or recycled material. Suitable examples include, but are not limited to, filtration, centrifugation, bleaching, degumming and phase separation. It is also to be understood that several separation methods, e.g. filtration and centrifugation, may be combined. Preferably the removal is accomplished by filtration. The removal is preferably performed at any temperature from 100 to 180° C.

Removal or solids/precipitates, in particular those comprising phosphorous, avoids deactivation of the hydrotreating catalyst in hydrotreatment of the renewable or recycled material.

The recycled or renewable organic material treated in accordance with steps (c), and optionally steps (b), (d) and/or (e), of the present method typically comprises significantly lower content of oxygen and phosphorous as compared to the biomass-based lipid material prior to purification.

An applicable purification step (c) and optional steps (b), (d) and/or (e), provide a purified recycled or renewable organic material, wherein the oxygen content of the recycled or renewable organic material is reduced by at least 10%, preferably at least 30%, more preferably at least 50% as compared to the recycled or renewable organic material provided in step (a). This leads to reduced hydrogen consumption in hydrotreatment processing of the recycled or renewable organic material in step (f). Further step (c) leads to precipitation of phosphorous compounds that can be removed in step (e) and the phosphorous content of the recycled or renewable organic material is thus reduced at least 10%, preferably at least 30%, more preferably at least 50% as compared to the recycled or renewable organic material provided in step (a).

For obtaining the desired hydrocarbons from the recycled or renewable organic material, the recycled or renewable organic material treated in accordance with steps (c), and optionally steps (b), (d) and/or (e), is then subjected to (f) hydrotreating the recycled or renewable organic material in a presence of a hydrotreating catalyst.

The term "hydrotreating" refers to a chemical engineer process in which reaction of hydrogen is used to remove impurities, such as oxygen, sulfur, nitrogen, phosphorous, silicon and metals, especially as part of oil refining.

Hydrotreating can be performed in one or several steps in one or more reactor units or catalyst beds.

Step (f) is typically achieved under continuous hydrogen flow. For achieving optimal results the continuous hydrogen flow is step (f) preferably has H2/feed ratio from 500 to 2000 n-L/L, more preferably from 800 to 1400 n-L/L.

In step (f) hydrotreatment is advantageously performed at a temperature from 270 to 380° C., preferably from 275 to 360° C., more preferably from 300 to 350° C. Typically the pressure in step (0 is from 4 to 20 MPa.

The hydrotreating catalyst is step (f) preferably comprises at least one component selected from IUPAC group 6, 8 or 10 of the Periodic Table. Preferably the hydrotreating catalyst in step (f) is a supported Pd, Pt, Ni, NiW, NiMo or a CoMo catalysts and the support is zeolite, zeolite-alumina, alumina and/or silica, preferably $NiW/Al_2O_3$, $NiMo/Al_2O_3$ or $CoMo/Al_2O_3$. In particular the hydrotreating catalyst is a sulfided NiMO or CoMo catalyst.

In a particular example step (f) is accomplished by (f1) hydrodeoxygenating (HDO) the heat treated recycled or renewable organic material fraction. This is preferably achieved in a presence of a HDO catalyst at a temperature from 290 to 350° C. under pressure from 4 to 20 MPa and under continuous hydrogen flow.

The term "hydrodeoxygenation (HDO)" refers to removal of oxygen as water by the means of molecular hydrogen under the influence of a (HDO) catalyst.

The time during which the recycled or renewable organic material is heated and held at the desired temperature, i.e. residence time, is typically from 1 to 300 min, preferably from 5 to 240 min, more preferably from 30 to 90 min in step (f1).

Step (f1) is performed under pressure from 4 to 20 MPa and under continuous hydrogen flow. Preferably the continuous hydrogen flow has H2/feed ratio from 500 to 2000 n-L/L, preferably from 800 to 1400 n-L/L.

The HDO catalyst may for example be selected from a group consisting of NiMO—, CoMo—, NiW-catalysts. Preferably the HDO catalyst in step (f1) is sulfided NiMO, sulfided CoMo or sulfided NiW-catalyst or any mixture thereof.

Advantageously step (f1) is performed to obtain hydrodeoxygenated recycled or renewable organic material comprising less than 1 wt % oxygen.

For achieving optimal results part of the deoxygenated recycled or renewable organic material may be recycled in step (f1). Preferably the ratio of the fresh feed i.e. purified recycled or renewable organic material obtained in previous step to the recycled deoxygenated recycled or renewable organic material is from 2:1 to 20:1.

In another example step (f) is accomplished by (f2) hydrodesulfurizing (HSD) the heat treated recycled or renewable organic material fraction. The term "hydrodesulfurisation (HDS)" refers to removal of sulfur as hydrogensulfide by the means of molecular hydrogen under the influence of a (HDS) catalyst.

In another example step (f) is accomplished by (f3) hydrometaillizing (HDM) the heat treated recycled or renewable organic material fraction. The term "hydrometallization (HDM)" refers to removal of metals by trapping them with a (HDM) catalyst.

In another example step (f) is accomplished by (f4) hydrodenitrificating (HDN) the heat treated recycled or renewable organic material fraction. The term "hydrodenitrification (HDN)" refers to removal of nitrogen by the means of molecular hydrogen under the influence of a (HDN) catalyst.

In another example step (f) is accomplished by (f5) hydrodesaromatising (HDA) the heat treated recycled or renewable organic material fraction. The term "hydrodearomatisation (HDA)" refers to saturation or ring opening of aromatics by the means of molecular hydrogen under the influence of a (HDA) catalyst.

Figure 1:
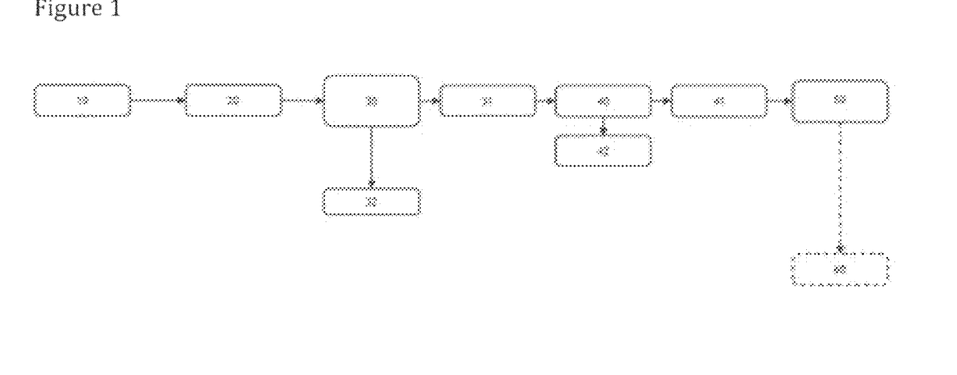
FIG. 1 illustrates a first exemplary process flow of the present method.

FIG. 1 illustrates a first exemplary process flow of the present method.

Referring to FIG. 1, a feed of recycled or renewable organic material, in particular tall oil pitch (TOP), 10 is subjected to a step of thermally cracking the recycled or renewable organic material as discussed herein for step (c). The heat treated feed of recycled or renewable organic material is then subjected to evaporation 30 as discussed herein for step (d) and a bottom containing thermally cracked recycled or renewable organic material fraction 31 and a vapor fraction 32 comprising the major part of volatile impurities is obtained. The thermally recycled or renewable organic material comprising degraded phosphorous containing impurities in solid form 31 is the subjected to removal of the solid impurities 40 as discussed herein for step (e), e.g. by filtration, to obtain to obtain purified recycled or renewable organic material 41 and solid impurities 42. The purified recycled or renewable organic material 41 is then hydrodeoxygenated 50, as discussed herein for step (f) flow to obtain hydrocarbons comprising less than 1 wt % oxygen and less than 10% of the original phosphorous content of the recycled or renewable organic material provided in step (a). The obtained hydrocarbons may then be subjected to catalytic upgrading 60.

After hydrocarbons have been produced in accordance with the present method, it may be subjected to further processing e.g. catalytic upgrading. Such catalytic upgrading processes include, but are not limited to, catalytic cracking, catalytic hydrocracking, thermo-catalytic cracking, catalytic hydrotreatment, fluid catalytic cracking, catalytic ketonization, and catalytic esterification. Such processes require the recycled or renewable organic material to be sufficiently pure and free from impurities that may otherwise hamper the catalytic process or poison the catalyst(s) present in the process.

Accordingly the present invention further provides a process for producing recycled or renewable hydrocarbons, comprising steps of (x) producing hydrocarbons from a recycled or renewable organic material as discussed herein, and (y) subjecting the purified recycled or renewable organic material to an oil refinery conversion process, wherein the oil refinery conversion process comprises altering the molecular weight of the feed, removal of heteroatoms from the feed, altering the degree of saturation of the feed, rearranging the molecular structure of the feed, or any combination thereof to obtain at least one recycled or renewable hydrocarbon.

In a typical example of the present process the recycled or renewable hydrocarbon is a renewable traffic fuel or fuel component.

In an example of the present process, step (y) is hydrocracking. In such example, step (y) is preferably performed in a mild hydrocracking (MHC) refinery unit, in particular in a presence of a hydrocracking catalyst.

In another example of the present process, step (y) is steamcracking. In such example step (y) is preferably performed in a steamcracking unit.

In yet another example of the present process, step (y) is isomerization. In such example, step (y) is preferably performed in an isomerization unit.

Accordingly the present invention further provides a process for producing a renewable traffic fuel or fuel component, comprising the steps of (x) producing hydrocarbons from a recycled or renewable organic material as discussed herein, and (y) hydrodeoxygenating (HDO) the purified recycled or renewable organic material to obtain a renewable traffic fuel or fuel component. Step (y) is preferably performed in a mild hydrocracking (MHC) refinery unit, in particular in a presence of an alumina based HDO catalyst.

EXAMPLES

Example 1

The experiment was carried out in continuous tubular reactor loaded with silicon carbide >0.42 mm. The pressure was adjusted to 8 MPa partial pressure of hydrogen, with a hydrogen feed rate of 15.7 ml/h. The feed rate of tall oil pitch (TOP) was 15 g/h. When carrying out catalytic experiments in this reactor unit, this feed rate is usually applied when applying weight hour space velocities close to 1. The temperature was varied in the range 250→300→→350→400→450° C. and the liquid samples were analyzed.

Results

Results are shown in FIGS. 2 to 5.

Oxygen & Total Acid Number (TAN)

Figure 3:
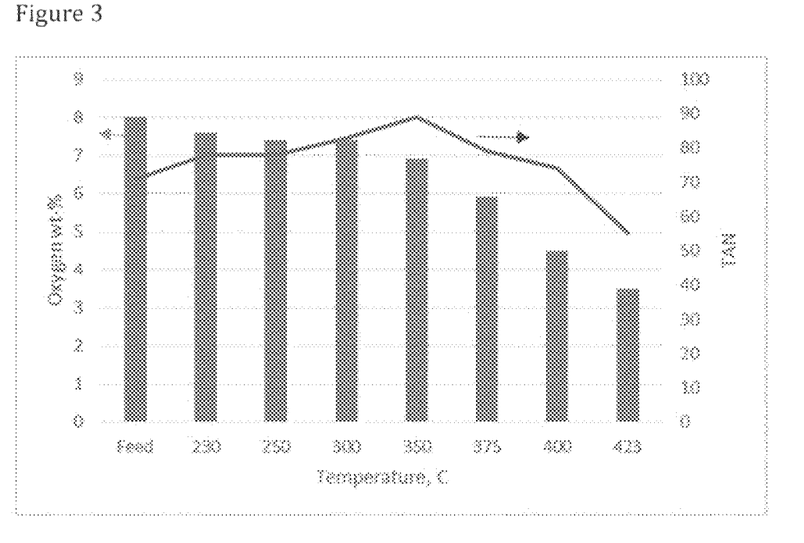
FIG. 3 shows oxygen content and TAN in feed and liquid product as function of temperature.

TAN increased from 71 in the feed to 89 at 350° C. after which it started to decrease. The increase in TAN is thought to be due to thermal decomposition of esters, forming acids and alcohols. Oxygen content started to decrease fast at 350° C. and was almost halved, compared to the feed, at 400° C.

Phosphorous

Figure 5:
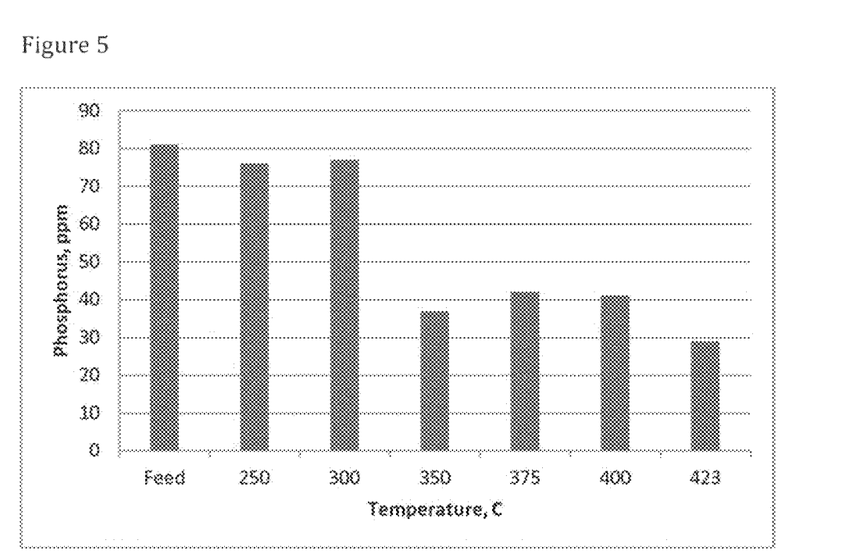
FIG. 5 shows phosphorous in feed and liquid product as function of temperature.

The phosphorous content was halved from 300 to 350° C. and stayed on the same level when increasing the temperature further.

Br-Number

Figure 4:
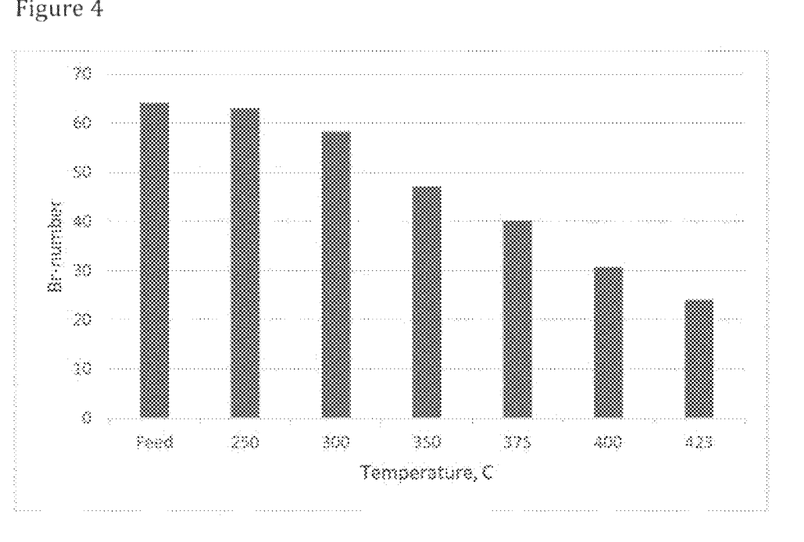
FIG. 4 shows Br-number of feed and liquid product as function of temperature.

Br-number started to decrease after 250° C. and was halved at 350° C., compared to the level of the feed. Br-number is a measure of the number of double bonds in the feedstock, and gives an idea about the reactivity of the components. As the Br-number is halved compared to the feedstock at 400° C., the reactivity of the feedstock due to the presence of double bonds is considerably reduced.

Sulphur

Figure 2:
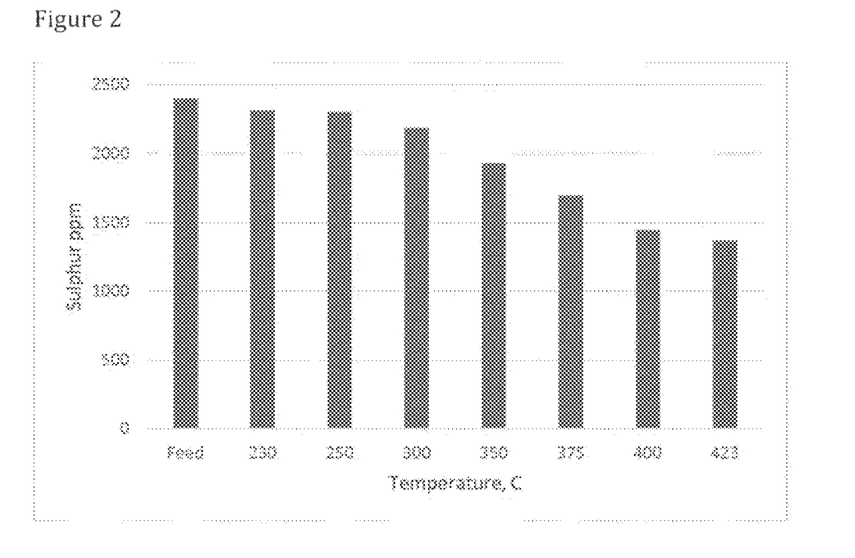
FIG. 2 shows sulfur content in feed and liquid product as function of temperature.

The sulfur content of the feed was 2400 ppm. The sulfur content in the liquid product started to decrease as the temperature increased above 250° C. (FIG. 2). At 400° C. the sulfur content was 1400 ppm.

It will be obvious to a person skilled in the art that, as the technology advances, the inventive concept can be implemented in various ways. The invention and its embodiments are not limited to the examples described above but may vary within the scope of the claims.

The invention claimed is:

1. A method of producing hydrocarbons from a recycled or renewable organic material, wherein the recycled or renewable organic material contains from 5 to 30 wt-% oxygen as organic oxygen compounds and from 1 to 1000 ppm phosphorous as phosphorous compounds, the method comprising:
   (a) providing the recycled or renewable organic material;
   (b) heat treating the recycled or renewable organic material at a temperature range selected to be 200 to 300° C., and/or 240 to 280° C. in a residence time selected to be 5 to 90 min, and/or 20 to 40 min, to form a heat treated recycled or renewable organic material, wherein the at least part of silicon compounds present in the recycled or renewable organic material are converted to volatile silicon compounds; and
   (c) thermally cracking at a temperature from 300 to 450° C. and at a pressure from 4 to 20 MPa the heat treated recycled or renewable organic material thereby reducing the oxygen and phosphorous content of the recycled or renewable organic material
   to obtain
   (i) a vapor fraction containing a major part of volatiles, and (ii) a thermally cracked recycled or renewable organic material fraction containing less oxygen and less phosphorous than the recycled or renewable organic material provided in step (a);
   (d) volatiles created due to the thermal cracking and/or otherwise present in the recycled or renewable organic material are removed;

(e) optionally removing solids/precipitates from the thermally cracked recycled or renewable organic material fraction; and (f) hydrotreating the thermally cracked recycled or renewable organic material fraction in a presence of a hydrotreating catalyst;

to obtain hydrocarbons containing less than 1 wt % oxygen and less phosphorous than the recycled or renewable organic material provided in step (a).

2. A method as claimed in claim 1, wherein the residence time is selected to be from 1 to 300 min, and/or from 5 to 240 min, and/or from 30 to 90 min in step (c).

3. A method as claimed in claim 2, wherein the pressure in step (c) is from 8 to 16 MPa.

4. A method as claimed in claim 3, wherein step (c) is performed at 350 to 400° C.

5. A method as claimed in claim 4, wherein the pressure in step (d) is selected to be from 0.1 to 5 kPa, and/or from 0.1 to 3 kPa.

6. A method as claimed in claim 5, wherein (e) the recycled or renewable organic material is subjected to removing solids/precipitates from the thermally cracked recycled or renewable organic material fraction.

7. A method as claimed in claim 6, wherein removing solids/precipitates is accomplished by filtration.

8. A method as claimed in claim 7, wherein hydrotreating step (f) takes place under continuous hydrogen flow.

9. A method as claimed in claim 8, wherein in step (f) the continuous hydrogen flow has an H2/feed ratio selected to be from 500 to 2000 n-L/L, and/or from 800 to 1400 n-L/L.

10. A method as claimed in claim 9, wherein step (f) is performed at a temperature selected to be from 270 to 380° C., and/or from 275 to 360° C., and/or from 300 to 350° C.

11. A method as claimed in claim 10, wherein step (f) is performed under pressure from 4 to 20 MPa.

12. A method as claimed in claim 11, wherein the hydrotreating catalyst in step (f) contains at least one component selected from IUPAC group 6, 8 or 10 of the Periodic Table.

13. A method as claimed in claim 12, wherein the hydrotreating catalyst in step (f) is a supported Pd, Pt, Ni, NiW, NiMo or a CoMo catalysts and the support is zeolite, zeolite-alumina, alumina and/or silica, NiW/Al$_2$O$_3$, NiMo/Al$_2$O$_3$ or CoMo/Al$_2$O$_3$.

14. A method as claimed in claim 13, wherein step (f) is accomplished by (f1) hydrodeoxygenating (HDO) the thermally cracked recycled or renewable organic material fraction.

15. A method as claimed in claim 14, wherein step (f1) is performed in a presence of a HDO catalyst at 290 to 350° C. under pressure from 4 to 20 MPa and under continuous hydrogen flow.

16. A method as claimed in claim 14, wherein step (f1) is accomplished by (f1) hydrodeoxygenating (HDO) the thermally cracked recycled or renewable organic material fraction in a presence of a HDO catalyst at a temperature from 290 to 350° C. under pressure from 4 to 20 MPa and under continuous hydrogen flow to obtain purified recycled or renewable organic material containing less than 1 wt % of oxygen and less phosphorous than the recycled or renewable organic material provided in step (a).

17. A method as claimed in claim 16, wherein in step (f1) the HDO catalyst is sulfided NiW, NiMO or CoMo catalyst.

18. A method as claimed in claim 17, wherein in step (f1) the continuous hydrogen flow has an H2/feed ratio selected to be from 500 to 2000 n-L/L, and/or from 800 to 1400 n-L/L.

19. A method as claimed in claim 18, wherein the phosphorous content of the purified recycled or renewable organic material is reduced one or more of at least 10%, and/or at least 30%, and/or at least 50% as compared to the recycled or renewable organic material provided in step (a).

20. A method as claimed in claim 19, wherein the pressure in step (b) is selected to be from 500 to 5000 kPa, and/or from 800 to 2000 kPa.

21. A process for producing recycled or renewable hydrocarbons, the process comprising:

(x) producing hydrocarbons from a recycled or renewable organic material as claimed in claim 1; and (y) subjecting the purified recycled or renewable organic material to a oil refinery conversion process, wherein the oil refinery conversion process includes altering a molecular weight of the feed, removal of heteroatoms from the feed, altering a degree of saturation of the feed, rearranging the molecular structure of the feed, or any combination thereof to obtain at least one recycled or renewable hydrocarbon.

22. A process as claimed in claim 21, wherein step (y) is hydrocracking.

23. A process as claimed in claim 22, wherein step (y) is performed in a mild hydrocracking (MHC) refinery unit.

24. A process as claimed in claim 23, wherein step (y) is performed in a presence of a hydrocracking catalyst.

25. A process as claimed in claim 21, wherein step (y) is steamcracking.

26. A process as claimed in claim 21, wherein step (y) is isomerization.

27. A process as claimed in claim 21, wherein step (y) is hydrotreating.

28. A process as claimed in claim 21, wherein step (y) is thermal catalytic cracking.

29. A process as claimed in claim 21 wherein step (y) is fluid catalytic cracking.

* * * * *